Figure 1:
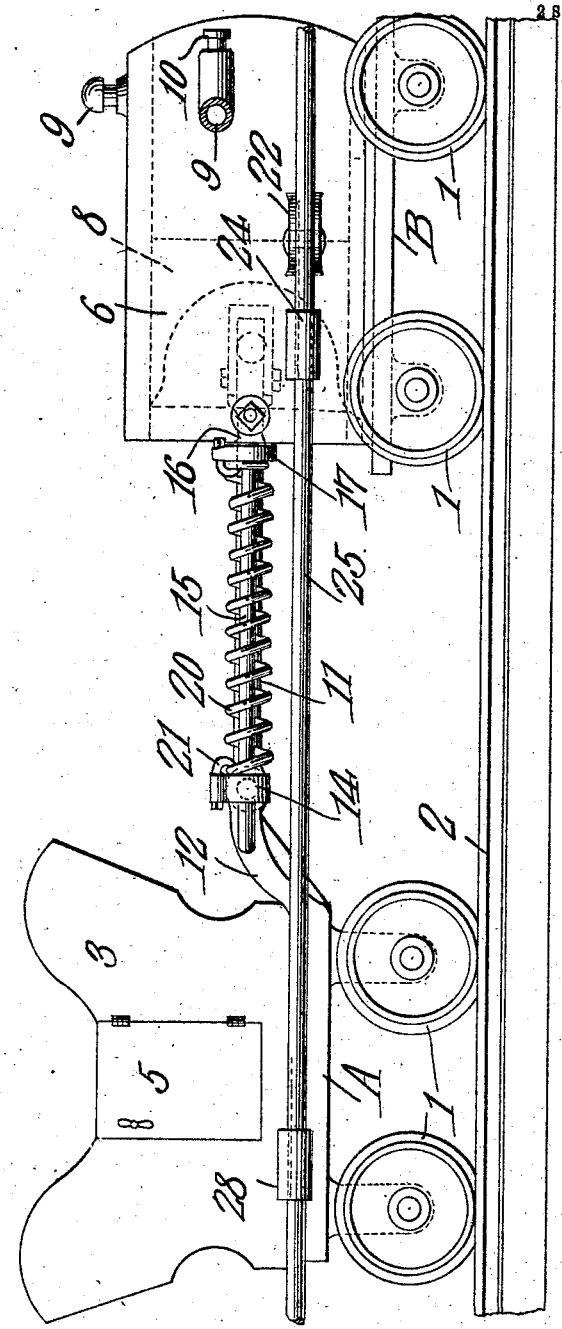

No. 850,018. PATENTED APR. 9, 1907.
C. KOHLMYER.
MOTOR VEHICLE.
APPLICATION FILED FEB. 7, 1907.

2 SHEETS—SHEET 1.

WITNESSES: Cornelius Kohlmyer, INVENTOR.
By C. A. Snow & Co.
ATTORNEYS

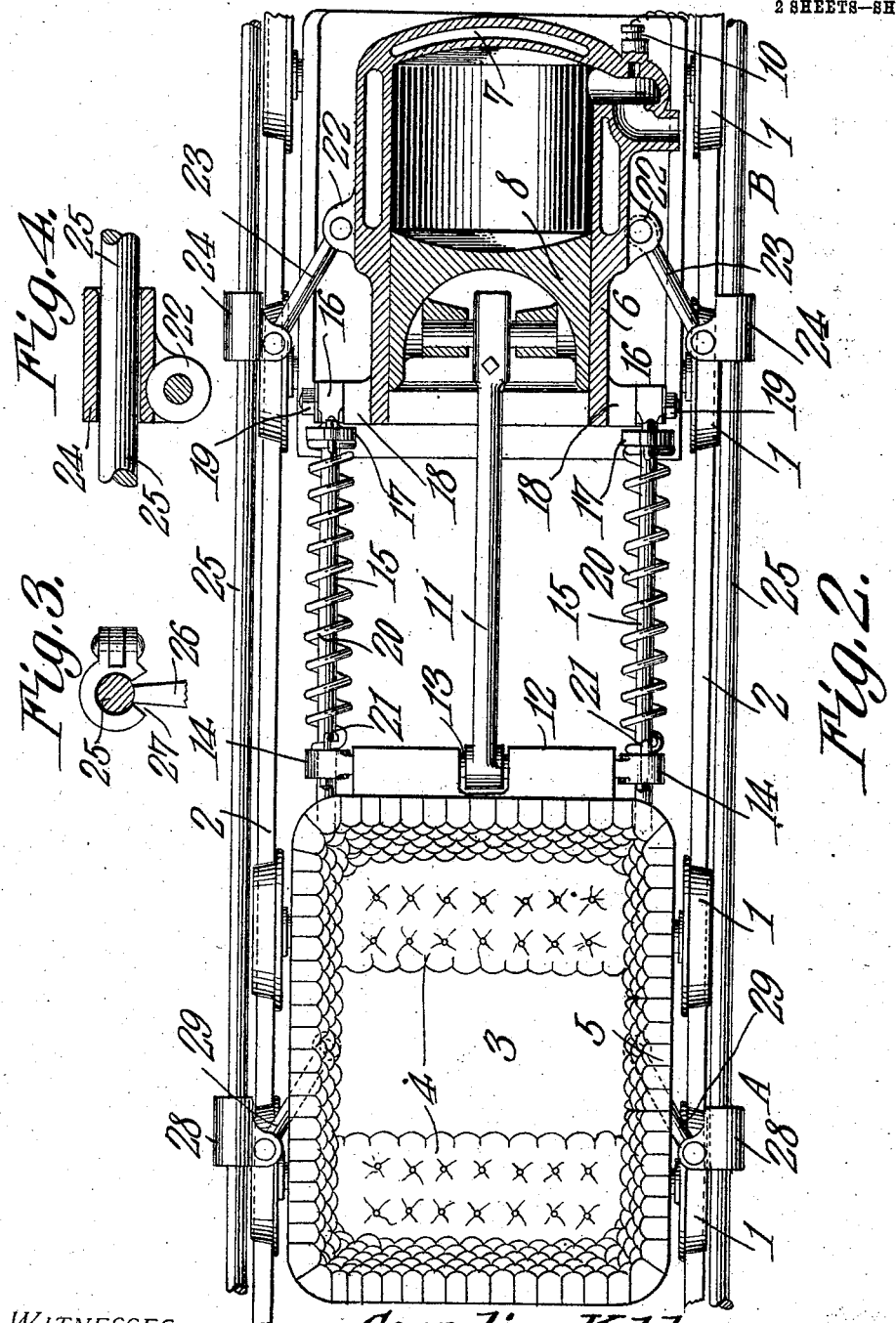

UNITED STATES PATENT OFFICE.

CORNELIUS KOHLMYER, OF LORAIN, OHIO.

MOTOR-VEHICLE.

No. 850,018.　　　Specification of Letters Patent.　　　Patented April 9, 1907.

Application filed February 7, 1907. Serial No. 356,229.

*To all whom it may concern:*

Be it known that I, CORNELIUS KOHL-MYER, a citizen of the United States, residing at Lorain, in the county of Lorain and State of Ohio, have invented a new and useful Motor-Vehicle, of which the following is a specification.

This invention has reference to improvements in motor-vehicles designed more especially for travel upon a fixed route along which the vehicle is constrained to move by means of tracks or guide-rails, or both.

The object of the invention is to provide means whereby a very high rate of speed may be attained without danger of shocks or strains upon the mechanism employed.

To this end I utilize the explosive force of gas-and-air mixtures to impart to the traveling vehicle rapid successive movements always in the same direction, the said movements following each other with great rapidity, so as not to be perceptible to a person riding in the vehicle and to therefore cause no inconvenience to such a person. At the same time shocks to the machinery are guarded against by elastic buffers, which in themselves also constitute part of the propelling mechanism.

The invention consists, essentially, in an explosive-motor mounted upon a traveling vehicle, which may, if desired, be in the form of a truck traveling on rails, and this motor is connected to another truck or vehicle through the intermediary of powerful springs and a direct connection with a piston propelled by the explosive action of the gases. Both trucks are coupled through suitable clutch mechanisms to guide rails or bars along the line of travel, so that the two trucks are moved forward by successive intermittent connections to said guide-rails in a manner which will hereinafter appear.

The invention will be fully understood from the following detailed description, taken in connection with the accompanying drawings, forming a part of this specification, in which—

Figure 1 is a side elevation of the improved motor-vehicle. Fig. 2 is a plan view of the same with parts in section. Fig. 3 is an end view of one of the clutches, showing the guide-rail in section; and Fig. 4 is a longitudinal section of one of the clutches, showing the guide-rail in elevation.

Referring to the drawings, there is shown a leading truck A and a motive or power truck B. Each truck is shown as mounted upon wheels 1, traveling upon rails 2 of the ordinary construction usually employed upon railways, or these trucks may be mounted upon wheels such as are used in automobiles and the rails may be discarded.

The truck A is shown as provided with a body 3, containing seats 4 and a door 5, so that this truck is suitable for the accommodation of passengers or others to be carried upon the vehicle.

The power-truck B carries a cylinder 6, of the general type usually employed in explosive-engines. This cylinder is provided with a suitable water-jacket 7 for cooling it, and within it is a piston 8 of the usual type employed in such engines.

The inlet port or ports for the explosive mixture and the exhaust port or ports are not shown in detail, but are simply indicated at 9, and the means for igniting the mixture at the proper time is indicated at 10 in the form of an ordinary spark-plug. It will be understood, however, that the various connections usually employed in explosive-engines will be utilized in practice and that for the sake of simplicity of the drawings these various structures, which form no part of the present invention and which are well known, have been omitted.

The piston 8 is connected, by means of a pitman 11, to a frame 12, either directly or, as shown in the drawings, through a cross-bar 13, the ends of which are formed into eyes 14. Extending through these eyes 14 are rods or bars 15, coming from the truck B, where they are formed into heads 16, with abutting portions 17, and these headed ends are secured to bosses 18 on the sides of the cylinder 6 by means of nuts 19. Each rod is surrounded by a helical spring 20, connected to the abutting portions 17 of the heads 16 at one end, and to the eyes 14, formed on the bar 13, at the other end by means of hook-bolts 21.

Attached to the truck B by means of ears 22 and links 23 are sleeves 24, arranged to travel upon guide-rods 25 on each side of the line of travel of the motor-vehicle and rigidly fixed by supports 26, fast upon any suitable supporting means along the line of way. The sleeves 24 are open along one side, as shown at 27, Fig. 3, so as to pass the supports 26. The truck A is likewise supplied with similar sleeves 28, connected to it by links 29.

The sleeves 24 and 28 are coupled to the links 23 and 29, respectively, by pivot connections near one end of said sleeves, so that a force exerted on the links tending to move the sleeves in one direction will move them easily on the guide-rails 25, while a force tending to move the sleeves in the other direction will cause them to grip these guide-rails.

Now let it be assumed that the piston 8 is in its rearmost position in the cylinder 6 and about to start forward under the impulse of an explosion. When the piston is in its rearmost position, the springs 20 are in their normal or non-extended position, and the two trucks are close together. The explosive action of the gases will force the piston 8 toward the front end of the cylinder. The tendency of the truck B will be to move backward; but this action is opposed by the clutching action of the sleeves 24, which under the force then applied will grip the guide-rods 25. The result is that on the forward movement of the piston 8, this movement being transmitted through the pitman 11, the truck A will be moved away from the stationary truck B, since the force then applied upon the links 29 tends to slide the sleeves 28 along the bars 25 without clutching them. At the same time the springs 20 are extended to the position shown in the figures and are therefore put under extension strain. As soon as the explosive force of the gases has been expended the springs 20 will react and tend to draw the two trucks together. The clutches 28 on the truck A now engage the bars 25 and prevent retrograde motion of the truck A. The result is that the springs will drag the truck B toward the truck A, since this motion is not opposed by the clutches 24. At the same time the piston 8 has been moved rearwardly to the position to compress a new charge, which in the meantime has been introduced into the explosion-chamber, and the explosion again takes place, and the cycle of operations is repeated. Of course it will be understood that in this cycle of operations the explosive-engine should be of the two-cycle type; but a four-cycle engine could be easily adapted for use in place of one of the two-cycle type.

From the foregoing it will be seen that in the operation of this device the parts are always moving forward and never backward, and when some of the parts are stationary the resultant sum of the motions is always in the forward direction. It will also be seen that a very large percentage of power is applied in the forward direction, while but a comparatively minute part of the power is necessary to move the rear truck up to the front truck and to compress the fresh charges, this action being entirely performed by the power stored up in extending the springs 20, which power need be but a very small fraction of that used in propelling the vehicle as a whole.

The guide-rails 25 will be extended along the line of way and should be firmly braced. If rails are employed and the trucks are provided with flanged wheels, as indicated, a portion of the strain will be taken from the guide-bars 25; but if ordinary automobile-wheels are used these guide-bars will be made strong enough for the purpose of guiding such a vehicle.

Since the moving parts of the motor and of the motor-vehicle always move in the same direction and though coming to rest never have a retrograde movement, a very high speed may be obtained by the explosive type of engine, although, of course, other types of engines may be used; but it is found that the explosive type of engine is particularly adapted to this invention.

I claim—

1. A motor-vehicle comprising two connected members, means for causing said members to move to and from each other, and means for holding the members in succession against movement in one direction to produce a resultant movement in the other direction only.

2. A motor-vehicle comprising two interconnected members, a power unit carried by the vehicle and constructed to produce a relative movement of the two members to and from each other, and means for converting the relative movement of the two members into a resultant movement in one direction only.

3. A motor-vehicle comprising two members elastically connected, a power-generator upon one of the members and coupled directly to the other member and arranged to move the two members to and from each other, and means for holding both of said members against positive movement except in one direction only.

4. A motor-vehicle comprising two trucks, spring connections between the same, a reciprocating power-motor carried on one truck and connected to the other truck and arranged to produce a relative movement of the two trucks to and from each other, and connections to fixed parts along the line of way for converting the relative reciprocation of the trucks into resultant movement in one direction only.

5. A motor-vehicle comprising two trucks, spring connections between the same, an explosive-engine mounted upon one truck, connections between the piston of the engine and the other truck, and clutch members carried by each truck and arranged to engage fixed structures along the line of way.

6. A motor-vehicle comprising two trucks, spring connections therebetween, an explosive-engine mounted upon one of the trucks and having its piston connected directly to the other truck, fixed guide-rails along the line of travel of the trucks and on each side thereof, and clutch members traveling on said guide-rails and arranged to clutch the same when a force is applied tending to cause a retrograde movement of either of the trucks.

7. A motor-vehicle comprising two trucks, means for producing a relative movement of the trucks to and from each other, guide-rails along the line of way and on each side of the trucks, clutch-sleeves on said guide-rails, and connections between the clutch-sleeves and each truck whereby the clutches engage the guide-rails when a force is applied to either truck tending to move it in one direction and disengaging or unclutching the guide-rails when a force is applied tending to move the trucks in the other direction.

8. A motor-vehicle comprising two trucks, guide-rails therefor, one-way clutches carried by the guide-rails and connected to each truck, extension-springs connecting the two trucks, and an explosive-engine upon one truck having its piston connected directly to the other truck and tending to move the trucks away from each other.

9. A motor-vehicle comprising two trucks, spring connections between the same tending to draw the trucks toward each other, a power-generator on one of the trucks tending to move the trucks away from each other, and means for restricting the movement of the trucks to one direction only.

10. A motor-vehicle comprising two trucks, guide-rails on each side thereof, one-way clutches connected to each truck, springs connecting the trucks and tending to draw them toward each other, an explosive-engine having its piston impelled in one direction only by the explosion, and connections between the piston and the other truck whereby the power-stroke of the engine tends to move the trucks apart and to extend the springs.

11. A motor-vehicle comprising two trucks, guide-rails on each side of the same, clutch-sleeves on the guide-rails, link connections between the same and the trucks, rods carried by one truck and movably supported in the other, springs surrounding said rods and coupled to both trucks and tending to draw the trucks toward each other, and an explosive-engine carried by one truck and having its piston directly connected to the other truck and tending on its power-stroke to move the trucks away from each other against the action of the springs.

In testimony that I claim the foregoing as my own I have hereto affixed my signature in the presence of two witnesses.

CORNELIUS KOHLMYER.

Witnesses:
W. J. COULTER,
WM. ROBB.